(12) United States Patent
Yang et al.

(10) Patent No.: US 8,510,722 B2
(45) Date of Patent: Aug. 13, 2013

(54) DETECTING DATA RACE AND ATOMICITY VIOLATION VIA TYPESTATE-GUIDED STATIC ANALYSIS

(75) Inventors: Yue Yang, Redmond, WA (US); Anna Gringauze, Redmond, WA (US); Dinghao Wu, Redmond, WA (US); Henning K. Rohde, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 1056 days.

(21) Appl. No.: 12/507,230

(22) Filed: Jul. 22, 2009

(65) Prior Publication Data

US 2011/0022893 A1  Jan. 27, 2011

(51) Int. Cl.
*G06F 9/44* (2006.01)

(52) U.S. Cl.
USPC .......................................................... 717/131

(58) Field of Classification Search
USPC .......................................................... 717/131
See application file for complete search history.

(56) References Cited

U.S. PATENT DOCUMENTS

| | | | |
|---|---|---|---|
| 4,550,350 A * | 10/1985 | Billings | 360/15 |
| 6,343,371 B1 | 1/2002 | Flanagan et al. | |
| 7,028,119 B2 | 4/2006 | Hue | |
| 7,174,554 B2 | 2/2007 | Pierce et al. | |
| 7,316,005 B2 | 1/2008 | Qadeer et al. | |
| 7,366,956 B2 | 4/2008 | Karp et al. | |
| 2007/0245312 A1* | 10/2007 | Qadeer et al. | 717/124 |
| 2008/0109641 A1 | 5/2008 | Ball et al. | |
| 2008/0244332 A1 | 10/2008 | Edwards et al. | |
| 2008/0281563 A1 | 11/2008 | Ganai et al. | |

OTHER PUBLICATIONS

Abadi et al., "Types for Safe Locking: Static Race Detection for Java," *ACM Transactions on Programming Languages and Systems*, 28(2): 207-255, Mar. 2006, http://portal.acm.org/citation.cfm?id=651882, downloaded May 29, 2009.

Artho et al., "High-level Data Races," http://research.nii.ac.jp/~cartho/papers/stvr03.pdf, downloaded May 29, 2009, 20 pages.

Artho et al., "Using Block-Local Atomicity to Detect Stale-Value Concurrency Errors," http://staff.aist.go.jp/c.artho/papers/b1-atomicity.pdf, 15 pages, downloaded May 29, 2009.

(Continued)

*Primary Examiner* — Wei Zhen
*Assistant Examiner* — Lanny Ung
(74) *Attorney, Agent, or Firm* — Chin IP, PLLC; David Chin

(57) ABSTRACT

Mechanisms for analyzing computer instructions implementing a program in which typestate analysis is informed by concurrency analysis. The concurrency-guided typestate analysis may simulate the "worst case" scenario due to thread interleaving by transitioning a simulated state of the variable to a special state whenever the variable is not guarded by its intended guarding lock. While in the special state, the analysis may assume that the state of the simulated variable is the worst possible state with respect to processing operations that may lead to an error depending on the state of the variable. Thus, the analysis performed may assume that referencing the variable in a state-dependent operation while the simulated state of the variable is in the special state may lead to an error, and the analysis may generate a warning, accordingly. The analysis may process the computer instructions to infer which lock is intended to guard a shared variable.

16 Claims, 9 Drawing Sheets

(56) References Cited

OTHER PUBLICATIONS

Boyapati et al., "Ownership Types for Safe Programming: Preventing Data Races and Deadlocks," *ACM Conference on Object-Oriented Programming, Systems, Languages and Applications (OOPSLA)*, Seattle, Washington, Nov. 2002, pp. 211-230, ACM 1581134171/02/0011, http://www.eecs.umich.edu/~bchandra/publications/oopsla02.pdf, downloaded May 29, 2009.

Chugh et al., "Dataflow Analysis for Concurrent Programs Using Datarace Detection," *PLDI'08*, Jun. 7-13, 2008, Tucson, Arizona, ACM 978-1-59593-860-2/08/2006, http://pho.ucsd.edu/rjhala/papers/radar.pdf, downloaded May 29, 2009, 11 pages.

Das et al., "ESP: Path-Sensitive Program Verification in Polynomial Time," *PLDI'02*, Jun. 17-19, 2002, Berlin, Germany, ACM 1-58113-463-0/02/0006, http://www.cs.cornell.edu/courses/cs711/2005fa/papers/dls-pldi02.pdf, downloaded May 29, 2009, 12 pages.

Deline et al., "Enforcing High-Level Protocols in Low-Level Software," *PLDI* 2001 Snowbird, Utah, ACM 089791886/7/05, 11 pages, http://www.cs.mu.oz.au/~sulzmarin/reading/pldi01.pdf, downloaded May 29, 2009.

Elmas et al., "VYRD: VerifYing Concurrent Programs by Runtime Refinement-Violation Detection," *Proc. 2005 ACM SIGPLAN Conference on Programming Language Design and Implementation*, Jun. 12-15, 2005, Chicago, IL, *ACM 1-59593-056-6/05/0006*, pp. 27-37 (2005).

Emmi et al., "Lock Allocation," *POPL 2007*, 14 pages, http://www.cs.ucla.edu/~mje/docs/popl2007-talk.pdf, downloaded May 29, 2009.

Engler et al., "RacerX: Effective, Static Detection of Race Conditions and Deadlocks," *SOSP '03*, Oct. 19-22, 2003, Bolton Landing, New York, ACM 1-58113-757-5/03/0010, 16 pages, http://www.cs.rochester.edu/meetings/sosp2003/papers/p200-engler.pdf, downloaded May 29, 2009.

Field et al., "Typestate Verification: Abstraction Techniques and Complexity Results," http://citeseerx.ist.psu.edu/viewdoc/download;jsessionid=274154840B06377D6D80606B8B8B9191?doi=10.1.1.13.3789&rep=repl&type=pdf, 18 pages, downloaded May 29, 2009.

Flanagan et al., "A Type and Effect System for Atomicity," *PLDI'03*, Jun. 9-11, 2003, San Diego, California, ACM 1-58113-662-5/03/0006, http://www.soe.ucsc.edu/~cormac/papers/pldiO3.ps, downloaded May 29, 2009, 12 pages.

Flanagan et al., "Atomizer: A Dynamic Atomicity Checker for Multithreaded Programs (Summary)," Proceedings of the 18th International Parallel and Distributed Processing Symposium (*IPDPS'04*), http://www.cs.williams.edu/~freund/papers/atomizer-padtad.pdf, downloaded May 29, 2009, 3 pages.

Flanagan at al., "Type-Based Race Detection for Java," *PLDI 2000*, Vancouver, British Columbia, Canada, ACM 1-58113-199-2/00/0006, 14 pages, downloaded May 29, 2009.

Grossman, D., "Type-Safe Multithreading in Cyclone," *TLDI'03*, Jan. 18, 2003, New Orleans, Louisiana, ACM 1581136498/03/0001, 13 pages, http://www.cs.washington.edu/homes/djg/papers/cycthreads.pdf, downloaded May 29, 2009.

Hampapuram et al., "Symbolic Path Simulation in PathSensitive Dataflow Analysis," *PASTE '05*, Sep. 56, 2005, Lisbon, Portugal, http://blogs.msdn.com/cse/attachment/1077708.ashx, 7 pages, downloaded May 29, 2009.

Harris et al., "Language Support for Lightweight Transactions," *OOPSLA '03*, Oct. 26-30, 2003, Anaheim, California, ACM 1581137125/03/0010, 15 pages, http://research.microsoft.com/en-us/um/people/tharris/papers/2003-oopsla.pdf, downloaded May 29, 2009.

Henzinger et al., "Race Checking by Context Inference," *PLDI'04*, Jun. 9-11, 2004, Washington, DC, ACM 1581138075/04/0006, 13 pages, http://mtc.epfl.ch/~tah/Publications/race_checking_by_context_inference.pdf, downloaded May 29, 2009.

Hicks et al., "Lock Inference for Atomic Sections," ACM SIGPLAN Workshop on Languages, Compilers, and Hardware Support for Transactional Computing, (TRANSACT), 2006, pp. 1-6.

Kuncak et al., "Role Analysis," MIT LCS, 112 pages, http://www.cag.lcs.mit.edu/~rinard/presentation/pop102.ppt, downloaded May 29, 2009.

Lipton, R.J., "Reduction: A Method of Proving Properties of Parallel Programs," *Communications of the ACM* 18(12):717-721 (Dec. 1975), http://portal.acm.org/citation.cfm?doid=361227.361234, downloaded May 29, 2009.

"Lock_Lint—Static Data Race and Deadlock Detection Tool for C," http://developers.sun.com/solaris/articles/locklint.html pp. 1-39, downloaded Jul. 21, 2009.

Lu et al., "AVIO: Detecting Atomicity Violations via Access Interleaving Invariants," *ASPLOS'06* Oct. 21-25, 2006, San Jose, California, ACM 1-59593-451-0/06/0010, http://opera.cs.uiuc.edu/paper/asplos062-lu.ps, downloaded May 29, 2009, 12 pages.

Lu et al., "MUVI: Automatically Inferring Multi-Variable Access Correlations and Detecting Related Semantic and Concurrency Bugs," *SOSP'07*, Oct. 14.17, 2007, Stevenson, Washington, ACM 978-1-59593-591-05/07/0010, 14 pages, http://www.sosp2007.org/papers/sosp061-lu.pdf, downloaded May 29, 2009.

McCloskey et al., "Autolocker: Synchronization Inference for Atomic Sections," *POPL '06*, Jan. 11-13, 2006, Charleston, South Carolina, ACM 1-59593-027-210610001, http://berkeley.intel-research.net/dgay/pubs/06-popl-autolocker.pdf, downloaded May 29, 2009, 13 pages.

MSDN, "Run-Time Library Reference: SAL Annotations," http://msdn.microsoft.com/en-us/library/ms235402(VS.80).aspx, May 18, 2009, pp. 1-5, downloaded May 29, 2009.

Naik et al., "Conditional Must Not Aliasing for Static Race Detection," *POPL'07* Jan. 17-19, 2007, Nice, France, ACM 1-59593-575-04/07/0001, http://theory.stanford.edu/~aiken/publications/papers/popl07.pdf, downloaded May 29, 2009, 12 pages.

Naik et al., "Effective Static Race Detection for Java," *PLDI'06* Jun. 11-14, 2006, Ottawa, Ontario, Canada, ACM 1-59593-320-04/06/0006, http://citeseerx.ist.psu.edu/viewdoc/download?doi=10.1.1.81.585&rep=repl&type-pdf, downloaded May 29, 2009, 12 pages.

Narayanasamy et al., "Automatically Classifying Benign and Harmful Data Races Using Replay Analysis," *PLDI'07* Jun. 11-13, 2007, San Diego, California, ACM 978-1-59593-633-2/07/0006, http://portal.acm.org/citation.cfm?id=1273442.1250738, downloaded May 29, 2009, 10 pages.

Netzer et al., "What are Race Conditions?: Some Issues and Formalizations," *ACM Letters on Programming Languages and Systems*, 1(1):Mar. 1-12, 1992, http://cnscenter.future.co.kr/resource/security/os/race-conditions.pdf, downloaded May 29, 2009.

Patil et al., "Tools and Techniques to Identify Concurrency Issues," http://msdn.microsoft.com/en-us/magazine/cc546569(printer).aspx, May 20, 2009, pp. 1-8, downloaded May 29, 2009.

Pearce et al., "Efficient Field-Sensitive Pointer Analysis of C," *ACM Transactions on Programming Languages and Systems*, 30(1):4:1-4:42 Publication date: Nov. 2007, https://portal.acm.org/poplogin.cfm?dl—GUIDE&coll=GUIDE&comp_id=996835&want_href=delivery.cfm%3Fid%3D996835%26type%3Dpdf%26CFID%3D35071639%26CFTOKEN%3D18128040&CFID=35071639&CFTOKEN=18128040&td=1242644102082, downloaded May 29, 2009.

Pratikakis et al., "LOCKSMITH: Context-Sensitive Correlation Analysis for Race Detection," *PLDI'06* Jun. 11-14, 2006, Ottawa, Ontario, Canada, ACM 1-59593-320-4/06/0006, 12 pages, http://www.es.umd.edu/~ifoster/papers/pldi06.pdf, downloaded May 29, 2009.

Qadeer et al., "KISS: Keep It Simple and Sequential," SIGPLAN Conference on Programming Language Design and Implementation, *PLDI '04*, Jun. 9-11, 2004, Washington, D.C., ACM 1-55113-807-05/04/0006, pp. 14-24.

Ringenburg et al., "AtomCaml: First-Class Atomicity via Rollback," *ICFP '05*, Sep. 26-28, 2005, Tallinn, Estonia, ACM 1-59593-064-7/05/0009, http://www.cs.washington.edu/homes/djg/papers/atomcam1_icfp.pdf, downloaded May 29, 2009, 13 pages.

Sasturkar et al., "Automated Type-Based Analysis of Data Races and Atomicity," *PPoPP'05*, Jun. 15-17, 2005, Chicago, Illinois, ACM 1-59593-080-09/05/0006, http://portal/acm.org/citation.cfm?id-1065944.1065956, downloaded May 29, 2009, 12 pages.

Savage et al., "Eraser: A Dynamic Data Race Detector for Multi-Threaded Programs," *ACM Transactions on Computer Systems,*

15(4): 391-411 (1997), http://www.cs.washington.edu/homes/tom/pubs/eraser.pdf, downloaded May 29, 2009.

Savage et al., "Eraser: A Dynamic Data Race Detector for Multi-Threaded Programs," *Proceedings of the 16th ACM Symposium on Operating System Principles*, St. Malo, France, 1997, http://www.scs.stanford.edu/08wi-cs240/sched/readings/eraser.ndf, downloaded May 29, 2009, 21 pages.

Strom et al., "Typestate: A programming language concept for enhancing software reliability," *IEEE Trans. Software Eng* SB-12(1):157-171 (1986).

Vaziri et al., "Associating Synchronization Constraints with Data in an Object-Oriented Language," *POPL '06*, Jan. 11-13, 2006, Charleston, South Carolina, ACM 1-59593-027-2/06/0001, http://domino.research.ibm.com/comm/research_people.nsf/pages/tip.popl2006.html/$FILE/popl2006.pdf, downloaded May 29, 2009, 12 pages.

Voung et al., "RELAY: Static Race Detection on Millions of Lines of Code," *ESEC/FSE'07*, Sep. 3-7, 2007, Cavtat near Dubrovnik, Croatia, ACM 978-1-59593-811-04/07/0009, 10 pages, http://www.cs.ucsd.edu/~lerner/papers/relay.pdf, downloaded May 29, 2009.

Wang et al., "Runtime Analysis of Atomicity for Multithreaded Programs," *IEEE Transactions on Software Engineering*, 32(2):93-110, Feb. 2006, http://ieeexplore.ieee.org/xpl/freeabs_all.jsp?arnumber=1599419, downloaded May 29, 2009.

Xu et al., "A Serializability Violation Detector for Shared-Memory Server Programs," PLDI'05, Jun. 12-15, 2005, Chicago, Illinois, ACM 1-59593-056-06/05/0006, http://www.eecs.berkeley.edu/~bodik/research/pldi05-svd.pdf, downloaded May 29, 2009, 14 pages.

Yong et al., "Pointer Analysis for Programs with Structures and Casting," SIGPLAN '99, May 1999, Atlanta, Georgia, ACM 1-58113-083-X/99/004, pp. 91-103, http://portal.acm.org/citation.cfm?id=301631.301647, downloaded May 29, 2009.

Young et al., "Combining Static Concurrency Analysis with Symbolic Execution," *IEEE Transactions on Software Engineering* 14(10): 1499-1511, (1988) http://ieeexplore.ieee.org/stamp/stamp.jsp?tp=&arnumber=6195&isnumber=302, downloaded May 29, 2009.

Yu et al., "RaceTrack: Efficient Detection of Data Race Conditions via Adaptive Tracking," *SOSP'05*, Oct. 23-26, 2005, Brighton, United Kingdom. ACM 1-59593-079-5/05/0010, 14 pages, http://www.cs.ucsb.edu/~htzheng/teach/cs595s06/slides/sosp05-RaceTrack.pdf, downloaded May 29, 2009.

"SAL Annotations;" "Run-Time Library Reference;" retrieved on May 18, 2009; 5 pages; Microsoft Corporation; Redmond, WA.

Sterling, N.; "WARLOCK—A Static Data Race Analysis Tool;" Proceedings of the Winter 1993 USENIX Conference; Jan. 25-29, 1993; 12 pages; USENIX Association; San Diego, CA.

* cited by examiner

```
1    typedef struct {
2        CRITICAL_SECTION cs;
3        int* buffer;
4    } DATA;

5    void ProcessBuffer(DATA* p) {
6        EnterCriticalSection(&p->cs);
7        if (p->buffer == NULL) {
8            LeaveCriticalSection(&p->cs);
9            return;
10       }
11       LeaveCriticalSection(&p->cs);
12       // Do something
13       EnterCriticalSection(&p->cs);
14       *p->buffer = 1;
15       LeaveCriticalSection(&p->cs);
16   }

17   void FreeBuffer(DATA* p) {
18       EnterCriticalSection(&p->cs);
19       if (p->buffer) {
20           delete(p->buffer);
21           p->buffer = NULL;
22       }
23       LeaveCriticalSection(&p->cs);
24   }
```

FIG. 5A

```
1    void AccessBuffer(DATA* p) {
2        if (p->buffer == NULL) {
3            return;
4        }
5        EnterCriticalSection(&p->cs);
6        if (p->buffer != NULL) {
7            cout << *p->buffer << endl;
8        }
9        LeaveCriticalSection(&p->cs);
10   }
```

FIG. 5B

Annotation Example:
```
1    typedef struct {
2        CRITICAL_SECTION cs;
3        __guarded_by(cs) int* buffer;
4    } DATA;
```

FIG. 9A

Priority 1 (Lock is a field of parent of variable):
```
1    typedef struct {
2        CRITICAL_SECTION cs;
3        int* buffer;
4    } DATA_1;
```

Priority 2 (Lock reachable from parent of variable, but not at same level as variable):
```
5    typedef struct {
6        DATA_LOCKS *dl;
7        int* buffer;
8    } DATA_2;

9    typedef struct {
10       CRITICAL_SECTION cs1;
11       CRITICAL_SECTION cs2;
12       CRITICAL_SECTION cs3;
13       CRITICAL_SECTION cs4;
14   } DATA_LOCKS;
```

Priority 3 (Lock reachable from formal parameter location):
```
15   int ProcessBuffer(int *buffer, CRITICAL_SECTION *pcs);
```

Priority 4 (Lock reachable from global location):
```
16   CRITICAL_SECTION global_cs;
```

FIG. 9B

DETECTING DATA RACE AND ATOMICITY VIOLATION VIA TYPESTATE-GUIDED STATIC ANALYSIS

BACKGROUND

Tools exist for analyzing software, whether in source code format or in binary code format, to identify errors or possible problems in the software or program. Such program analysis tools may output warnings or errors, thus allowing a developer of the program to make changes to the program to fix the program, if necessary.

One type of program analysis tool for source code or binary code is a lock analysis tool, sometimes known as a concurrency analysis tool, which exists to detect possible errors that may arise due to incorrect use of locks in multi-threaded applications. An exclusive lock may be used to "guard" a shared variable from concurrent access from different threads that would allow one thread to change the variable in a way that would interfere with the other thread.

When a thread acquires a lock, the thread becomes the lock owner, which blocks other threads from accessing the shared variable until the owner thread releases the lock. Thus, in order to ensure that accesses to a shared variable are protected, all accesses to the shared variable in the program may need to be preceded by a lock acquisition and succeeded by a lock release. In some programming languages, the burden may fall on the developer to ensure that accesses to a shared variable are always protected by a lock.

The situation when a shared variable is accessed by at least two threads concurrently without being protected by a lock, in which at least one of the accesses is a write, is often known as a "race condition." Lock analysis tools may detect potentially problematic locking behavior, such as possible race conditions by detecting when a variable is accessed without being protected by a lock.

Another type of program analysis tool is a typestate analysis tool, which may perform typestate analysis on variables in the program. Typestate analysis may uncover errors in a sequential program flow that may indicate potential problems when particular operations intended to be invoked only on variables with appropriate states are invoked with variables having an inappropriate state for the operation. That is, typestate analysis may identify patterns in programs to indicate possible errors that arise when a state-dependent operation accesses a variable that is in a state in which the state-dependent operation may fail or cause an error condition to occur. Thus, accessing a variable in a state-dependent operation may lead to an error condition when that variable is associated with a particular set of type states. Yet, when the variable is associated with another set of type states, accessing that variable in a state-dependent operation may not cause an error.

One example of typestate analysis is NULL pointer analysis, which may detect if a pointer variable is being dereferenced when the type state of the pointer variable is NULL. As is known in the art, a pointer variable is intended to have a value indicating a memory location, so that dereferencing a pointer value attempts to access the memory contents at the value of the memory location. Dereferencing a pointer variable with a value of 0 (or NULL) in a program, however, may often lead to an error condition, including a possible program crash. A pointer with a value of 0 (or NULL) usually points to memory in a protected location (e.g., a protected memory page), and as such, an access to a memory location of 0 by a user-mode program will often cause an access violation exception, which may lead to a crash. Higher-level programming languages, such as C#, may have a more abstract interpretation of NULL in which an exception is generated in the runtime software.

Besides program analysis tools, developers may also make use of annotations. Annotations, such as those in the format of the program annotation language (SAL), designed by Microsoft Corporation, may describe the intended usage of certain aspects of the program. For example, annotations may describe how a function uses its parameters or return values—the assumptions the function makes about the parameters, and the guarantees the function makes upon its return.

SUMMARY

While existing types of program analysis such as conventional typestate analysis and conventional concurrency analysis may be useful in detecting certain types of errors, they are not adequate for detecting subtle errors in programming that may result when programs are executed in a multithreaded environment. Conventional typestate analysis is unable to understand threading effects, as it focuses solely on sequential execution, and therefore would miss many bugs introduced by threading issues. On the other hand, conventional concurrency analysis most often focuses on generic concurrency properties, such as the detection of race conditions, and is often overly conservative, resulting in a large amount of warnings that are benign.

Improved error correction is provided by a method and/or a tool for error detection. Some embodiments provide for a typestate-driven concurrency analysis for detecting race conditions and atomicity violations in which the typestate analysis is informed by concurrency analysis. The thread interference effect (i.e., the effect of having concurrent threads possibly accessing the same variable, whether at the same time or in an interleaved approach) may be simulated by reformulating a system performing typestate analysis so that the state transition of a shared variable is at least partially controlled by the locking state of that variable.

In some embodiments, the analysis may simulate a number of different scenarios (including all possible scenarios) due to thread interleaving. For example, the "worst case" scenario due to thread interleaving may be simulated by discarding the state information associated with a variable whenever the variable is not guarded by its intended guarding lock. This may be accomplished by transitioning the simulated state of the variable to a special "unlocked-uninitialized" state in which it is assumed that the state of the simulated variable is the worst possible state with respect to processing operations that may lead to an error depending on the state of the variable. Thus, the analysis performed may assume that referencing the variable in such a state-dependent operation while the simulated state of the variable is in the special "unlocked-uninitialized" state may lead to an error, and the analysis may generate a warning, accordingly.

In addition, in order to more precisely simulate the thread interference effect and determine which lock may be intended to protect which variable(s), some embodiments may apply inference techniques to automatically associate a lock with a shared variable and/or to automatically associate groups of shared variables as an atomic unit when it is inferred that such a group of shared variables is intended to be updated atomically.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 5A is an example of computer instructions that displays a problem that may be detected by concurrency-guided typestate analysis according to some embodiments, but that would fail to be detected by either conventional typestate analysis or by conventional concurrency analysis;

FIG. 5B is an example of computer instructions that may be correctly determined to be benign by concurrency-guided typestate analysis, but that may be incorrectly determined to be problematic by other types of analysis, such as conventional concurrency analysis;

FIG. 9A is an exemplary concurrency annotation; and

FIG. 9B is a computer instructions example of types of locations in which a lock associated with a shared variable may appear in the computer instructions.

DETAILED DESCRIPTION

Figure 1:
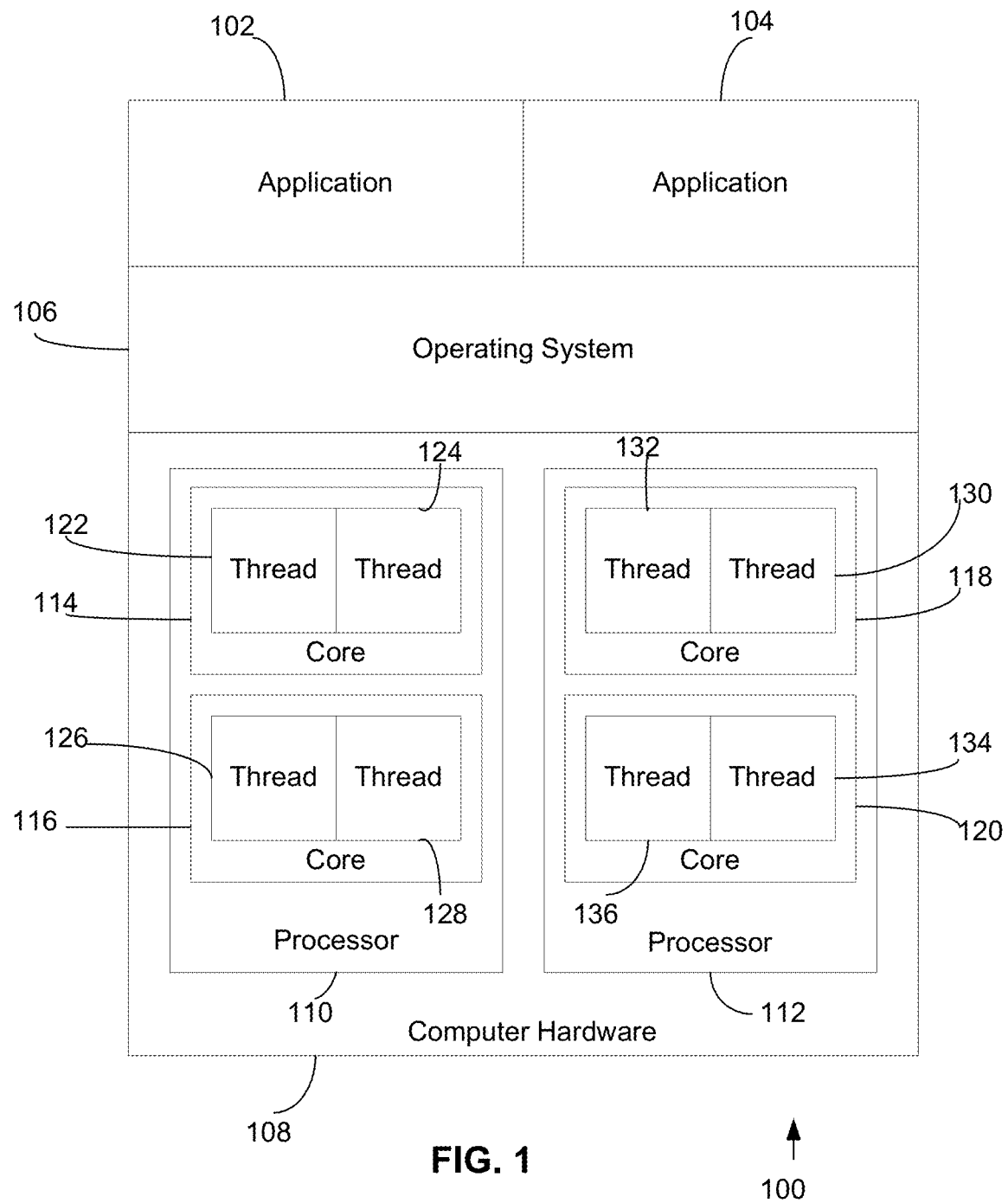
FIG. 1 is an exemplary computing environment in which race conditions or atomicity violations may occur.

The inventors have appreciated that the manufacture of software could be improved by providing a tool for more accurately detecting different types of race conditions. While known conventional typestate analysis and conventional concurrency analysis may be useful in detecting certain types of errors, these two types of analysis are not adequate for detecting subtle errors in programming that may result when programs are executed in a multithreaded environment. Conventional typestate analysis is unable to understand threading effects, as it focuses solely on sequential execution, while conventional concurrency analysis most often focuses on generic concurrency properties, such as the detection of race conditions. The disjoint nature of conventional typestate analysis compared to conventional concurrency analysis results in missed bugs. Conventional typestate systems are limited in the presence of concurrency because they would miss many bugs introduced by threading issues. On the other hand, conventional concurrency tools are often overly conservative, resulting in a large amount of warnings that are benign.

The inventors have further appreciated that having a program be free from race conditions does not necessarily guarantee correct synchronization, because program correctness may often depend on an additional property known as atomicity. Atomicity may require that every concurrent execution of a set of operations is equivalent to some serial execution of the same operations. A violation of the atomicity property may also be termed a "high level race condition."

The generation of a large amount of benign warnings by concurrency tools is especially a problem for atomicity analysis. Many seeming violations to the atomicity assumption are not harmful because they do not break any critical invariants of concern to programmers.

The inventors have appreciated the need for typestate analysis to be informed by concurrency analysis, and accordingly have developed a typestate-driven concurrency analysis for detecting race conditions and atomicity violations. The thread interference effect (i.e., the effect of having concurrent threads possibly accessing the same variable, whether at the same time or in an interleaved approach) may be simulated by reformulating a system performing typestate analysis so that the state transition of a shared variable is at least partially controlled by the locking state of that variable.

In some embodiments, the analysis may simulate a number of different scenarios (including all possible scenarios) due to thread interleaving. For example, the "worst case" scenario due to thread interleaving may be simulated by discarding the state information associated with a variable whenever the variable is not guarded by its intended guarding lock. This may be accomplished by transitioning the simulated state of the variable to a special "unlocked-uninitialized" state in which it is assumed that the state of the simulated variable is the worst possible state with respect to processing operations that may lead to an error depending on the state of the variable. Thus, the analysis performed may assume that referencing the variable in such a state-dependent operation while the simulated state of the variable is in the special "unlocked-uninitialized" state may lead to an error, and the analysis may generate a warning, accordingly.

In addition, in order to more precisely simulate the thread interference effect, it may be important to accurately determine which lock may be intended to protect which variable(s), as well as any group of variables that may need to be treated as an atomic unit. In order to address this issue, some embodiments may apply inference techniques to automatically associate a lock with a shared variable and/or to automatically associate groups of shared variables as an atomic unit.

Thus, the concurrency-guided typestate analysis approach identified by the inventors has several advantages over other approaches of performing conventional typestate analysis or conventional concurrency analysis. The "thread-sensitive" aspect of the analysis may extend traditional typestate checking from the sequential context to the multithreaded context, thus identifying a range of typestate errors that could not be identified using conventional typestate analysis techniques. The "typestate-driven" aspect of the analysis may also enable a more focused checking by pinpointing concurrency problems that could eventually lead to typestate bugs, thus avoiding a large number of benign warnings that may be output when performing stand-alone conventional concurrency analysis.

FIG. 1 is an exemplary computing environment 100 in which race conditions and atomicity violations may occur. Computing environment 100 may include one or more applications, such as applications 102 and 104, that may execute on top of an operating system 106. Applications 102 and 104 and operating system 106 may be implemented in any suitable way, and may be comprised of computer-executable instructions. For example, applications 102 . . . 104 may be a word processing application, a web browser, an MP3 player, or any other suitable application. Operating system 106 may be any suitable operating system, such as variants of the WINDOWS® operating system developed by Microsoft Corporation.

Applications 102 . . . 104 and operating system 106 may execute on computer hardware 108. Computer hardware 108 may be any suitable computer hardware, such as a laptop computer, desktop computer, server computer, mainframe computer, mobile device, PDA, or cellular phone. Computer hardware 108 may include one or more microprocessors, such as processors 110 and 112, each of which may be any suitable microprocessor implementing any suitable instruction set. Each processor may include one or more processing cores. In the example of FIG. 1, processor 110 includes cores 114 and 116, and processor 112 includes cores 118 and 120. Each of cores 114 . . . 120 may be able to simultaneously execute one or more hardware threads of execution. For example, core 114 may include support for simultaneously executing hardware threads 122 and 124, core 116 may include hardware threads 126 and 128, core 118 may include hardware threads 130 and 132, and core 120 may include hardware threads 134 and 136.

At least one of applications 102 . . . 104 and operating system 106 may be implemented as a multi-threaded program. Multi-threaded programs include multiple software threads that may be scheduled for simultaneous execution on a component of computer hardware 108. For example, multiple software threads may be executing simultaneously on one or more of processors 110 . . . 112, or in computing environments such as that illustrated by FIG. 1 in which a processor may contain multiple cores, each software thread may be scheduled for execution on a different core of cores 114 . . . 120. Because each core in computing environment 100 includes support for multiple hardware threads, each software thread may further be scheduled for execution on one or more of hardware threads 122 . . . 136 in the example of FIG. 1.

In a computing environment, such as computing environment 100, that includes support for concurrent processing of computer-executable instructions, such as multiple concurrent threads of execution, problems in a multithreaded program due to concurrency may be more pronounced than when the same program executes in a computing environment that does not support the concurrent execution of multiple threads. Examples of concurrency-related issues that may arise are race conditions, as discussed above, or atomicity violations. An atomicity violation, also known as a high-level race condition, may arise even if every access to a shared variable is protected by a lock. In general, an atomicity violation may occur when a concurrent execution of a set of operations is not equivalent to the serial execution of the same operations.

Figure 2:
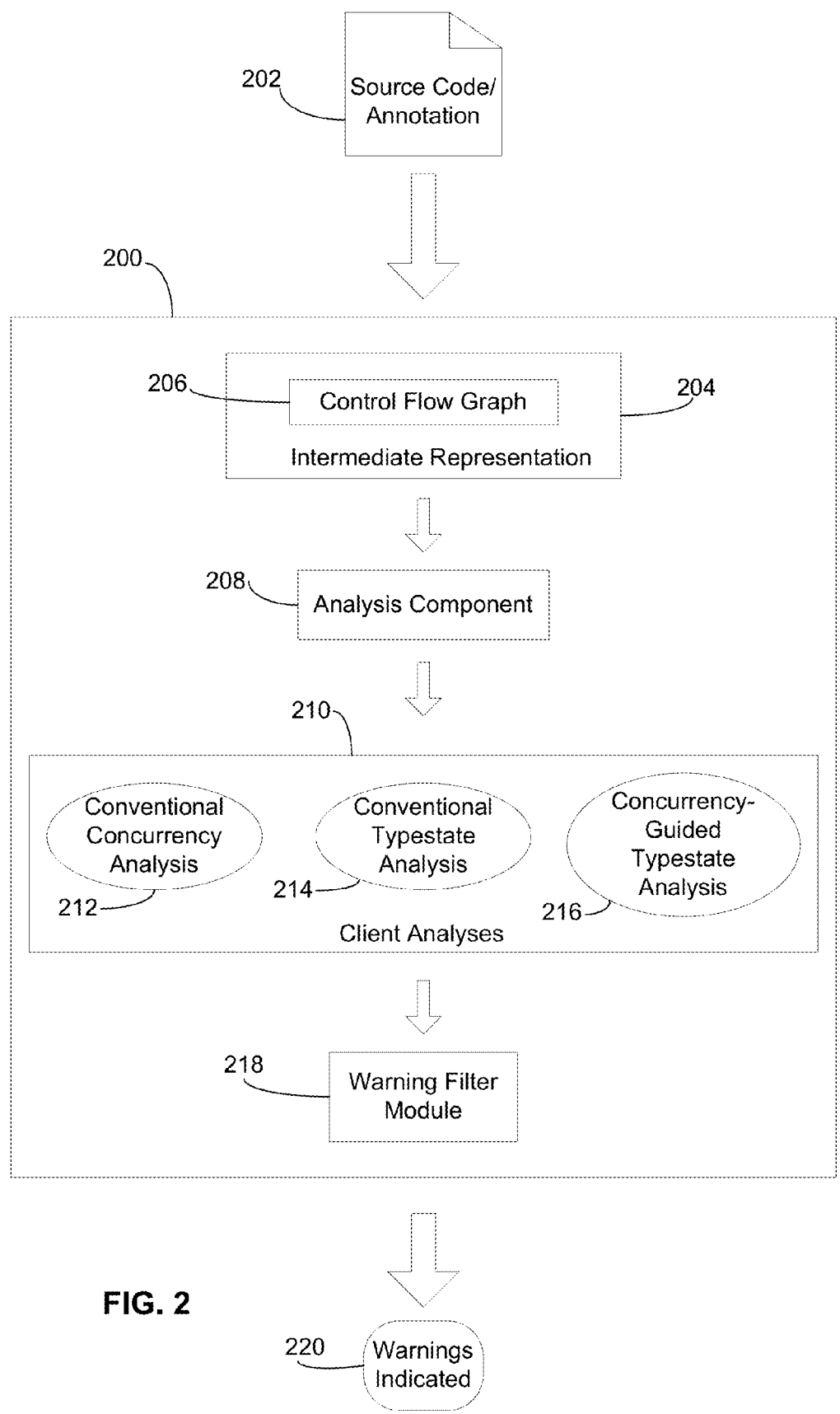
FIG. 2 is an architectural block diagram of components of a computer instructions analysis tool.

FIG. 2 is an architectural block diagram of components of a computer instructions analysis tool 200, which may execute on any suitable computer, such as a computer that may exist in a development environment as part of manufacturing a software application that may execute in a multi-threaded environment. The computer instructions analysis tool may receive as input a plurality of computer instructions 202 for analysis. The computer instructions 202 may include source code instructions and/or binary code instructions that may specify actions by a computer, and may implement one or more programs, including one or more multi-threaded programs. The computer instructions 202 may be in any suitable representation, including source code in a programming language, such as C or C++, or in an assembly language, that may need to be compiled and/or assembled into object code before execution on a computer. The computer instructions 202 may additionally or alternatively be the binary computer-executable instructions in the input program being analyzed. The computer instructions 202 may include one or more annotations describing the use of the computer instructions. If included in the computer instructions 202, the annotations may be in any suitable format, including the program annotation language (SAL) developed by Microsoft Corporation. The computer instructions 202 may be received by the analysis tool in any suitable format, including being read from volatile or non-volatile computer memory or read from one or more files accessed locally or over a computer network. The computer instructions analysis tool 202 may be invoked in any suitable way. For example, in embodiments in which the computer instructions 202 may need to be built (e.g., compiled, assembled, and/or linked) before the program they implement may be executed on a computer, the source analysis tool 200 may be integrated into the build process for the program and invoked automatically, or it may be invoked separately from the build process, such as by a developer interested in analyzing the computer instructions 202 during the course of software development.

The computer instructions analysis tool 200 may be implemented as computer-executable instructions on one or more computer-readable storage media. The analysis that may be performed by the computer instructions analysis tool may be part of an environment or process in which software is manufactured. For example, in such an environment, a software developer may develop a software program, which may be comprised of the computer instructions 202, and analyze computer instructions implementing the software program with the computer instructions analysis tool 202. Based on the results of the analysis, the software developer may then modify the software, such as by making changes to the computer instructions to fix issues identified by the analysis. The modified software may then be recorded onto a computer-readable storage medium, such as an optical disk or a hard disk, and shipped to a computer manufacturer or a software user.

Each of the components illustrated in FIG. 2 as comprising the computer instructions analysis tool 200 may be implemented as separate programs, as a single program, or in any suitable number of programs configured to work together as a coherent analysis tool. Functionality ascribed to the components (or layers of components) comprising the computer instructions analysis tool 200 may be distributed among any suitable number of components or layers of components, including a greater or lesser number of components or layers of components than those illustrated in FIG. 2. For example, the functionality ascribed to a single component or layer of components in FIG. 2 may also be divided among multiple components or layers of components, and the functionality ascribed to multiple components or layers of components in FIG. 2 may alternatively be ascribed to a single component or layer of components.

In the example of FIG. 2, the architecture of the computer instructions analysis tool 200 may comprise an intermediate representation layer 204 that may represent the flow of the program implemented by computer instructions 202 into one or more control flow graphs (CFGs), such as control flow graph 206. The intermediate representation layer 204 may also include processing annotations that may be present in the computer instructions 202. The computer instructions analysis tool may also include a layer of analysis components, illustrated in FIG. 2 as analysis component 208. Analysis component 208 may process the output of the intermediate representation layer 204, such as the control flow graph 206, to provide a path-sensitive dataflow engine with integrated alias analysis (e.g., a flow-insensitive, field-sensitive Andersen-style alias analysis), as well as providing symbolic path simulation.

The output of the layer of analysis components, such as analysis component 208, may be provided to a layer of one or more client analyses component 210, such as conventional concurrency analysis component 212, conventional typestate analysis component 214, and concurrency-guided typestate analysis component 216. Conventional concurrency analysis component 212 may perform any suitable type of lock analysis, and may be used to detect, for example, possible concurrency violations, race conditions or locking mismatch errors. In some embodiments, conventional concurrency analysis component 212 may also infer concurrency annotations, when these are not expressly indicated in the computer instructions 202.

Conventional typestate analysis component 214 may perform any suitable type of typestate analysis. Conventional typestate analysis component 214 may perform its analysis based on tracking the changing state of a variable in a simulated path in a control flow graph, and detecting when an operation in the computer instructions 202 references a variable having a simulated state that may cause a computer executing the operation to enter into an error state. However, in some embodiments, conventional typestate analysis 214 may not consider such typestate issues as that discussed above that may arise due to concurrency. Concurrency-guided typestate analysis component 216 may perform typestate analysis, but may additionally consider possible typestate issues due to concurrent access to a shared variable subject to typestate analysis by simulating the behavior that may arise when multiple threads in the program implemented by the computer instructions 202 may be running concurrently.

In some embodiments, the output of the components in the client analyses component 210 may include warnings indicating possible error conditions or items of concern in the computer instructions 202. Such warnings may be provided to a warning filter module 218, which may process the warnings to selectively output or otherwise indicate to a user only a subset of the warnings, such as warnings 220, produced by one or more components in the client analyses component 210. The filtering may be done in any suitable way, taking into account any suitable considerations. For example, in embodiments in which some types of warnings output by two or more components in client analyses component 210 may indicate an error associated with the same instruction or group of instructions representing an operation in the input program, the warning filter module 218 may compute the differences in warnings outputted by two or more components in client analyses components 210, and output only a set of warnings that were output by one components in the client analyses component 210 that were not output by another component of client analyses component 210.

Figure 3:
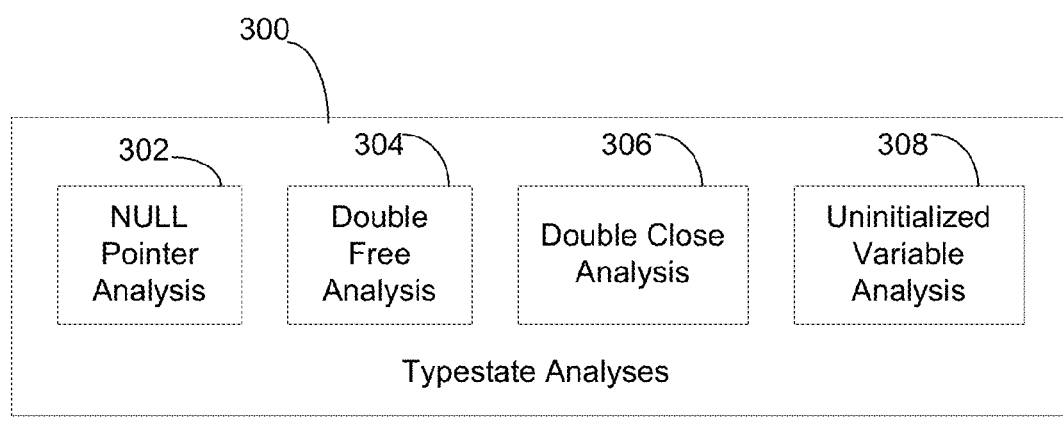
FIG. 3 is an architectural block diagram of types of typestate analysis that may be performed by a computer instructions analysis tool according to some embodiments.

Exemplary types of typestate analyses 300 are illustrated in FIG. 3, such as NULL pointer analysis 302, double free analysis 304, double close analysis 306 and uninitialized variable analysis 308. All the types of typestate analyses 300 or a subset thereof may be implemented by either or both of conventional typestate analysis component 214 and concurrency guided typestate analysis component 216 illustrated in FIG. 2. These are examples of components that may identify patterns in computer instructions to indicate possible errors that result from a state-dependent operation in the computer instructions referencing a variable that could have a state in which execution of the state-dependent operation may cause an error condition.

For example, NULL pointer analysis 302 may detect if a pointer variable is being dereferenced when the simulated state of the pointer variable is NULL. As is known in the art, a pointer variable is intended to have a value of a memory location, so that dereferencing a pointer value attempts to access the memory contents at the value of the memory location. Dereferencing a pointer variable with a value of 0 or NULL may cause a program, whether an application or an operating system, to crash.

Double free analysis 304 and double close analysis 306 are specific examples of a broader type of typestate analysis known as "matching analysis," or solving a matching problem, of which any other specific examples may also be analyzed by either or both of conventional typestate analysis component 214 or concurrency-guided typestate analysis component 216. In general, matching analysis applies when a first operation performed on a variable leaves the variable in a first state in which a second operation may be performed. The second operation leaves the variable in a second state. The second operation may only be performed on the variable when the variable is in the first state. Thus, the second operation must be "matched" with a previous first operation.

Double free analysis 304 may apply to a program in which memory is dynamically allocated and freed. When memory is dynamically allocated, such as by calling a dynamic allocation operation, the value of a memory location of the dynamically allocated memory may be stored in a variable. A subsequent free operation may reference the pointer variable to deallocate the memory at the value of the memory location stored in the variable. However, issuing a free operation twice in a row on the same variable storing the same memory location value without an intervening dynamic memory allocation may result in unintended consequences, such as corrupted memory or a program crash. Thus, double free analysis 304 may detect when a given sequence of operations in a simulated path in a control flow graph results in multiple free operations referencing the same memory location without an intervening dynamic memory allocation operation. The same problem may also occur in reverse, such as if two dynamic memory allocation operations reference the same variable without an intervening free operation. Such a "double allocation" problem may also result in unintended behavior, such as memory leaks.

Double close analysis 306 is similar in nature to double free analysis 304. An operation that opens a file typically stores information identifying the file in a file handle variable after the file has been successfully opened. An operation that closes a file may reference a file handle variable, and may rely on the file identified by the file handle variable to still be in the open state. Issuing multiple close operations referencing the same file handle variable identifying the same file without an intervening open operation may result in unintended consequences, such as a program crash or other errors. Thus, double close analysis 306 may detect when a given sequence of operations in a simulated path in a control flow graph results in multiple close operations referencing the file handle variable identifying the same file without an intervening close operation.

Uninitialized variable analysis 308 may be another form of typestate analysis that may apply to situations in which a particular operation relies on the state of a variable being initialized through some prior operation, such that if particular operation references the variable before the variable has been initialized, unintended consequences may result. Thus, uninitialized variable analysis 308 may detect when a given sequence of operations in a simulated path in a control flow graph results in a particular operation referencing a variable in an uninitialized state (i.e., before the variable has been initialized through a prior operation).

Figure 4:
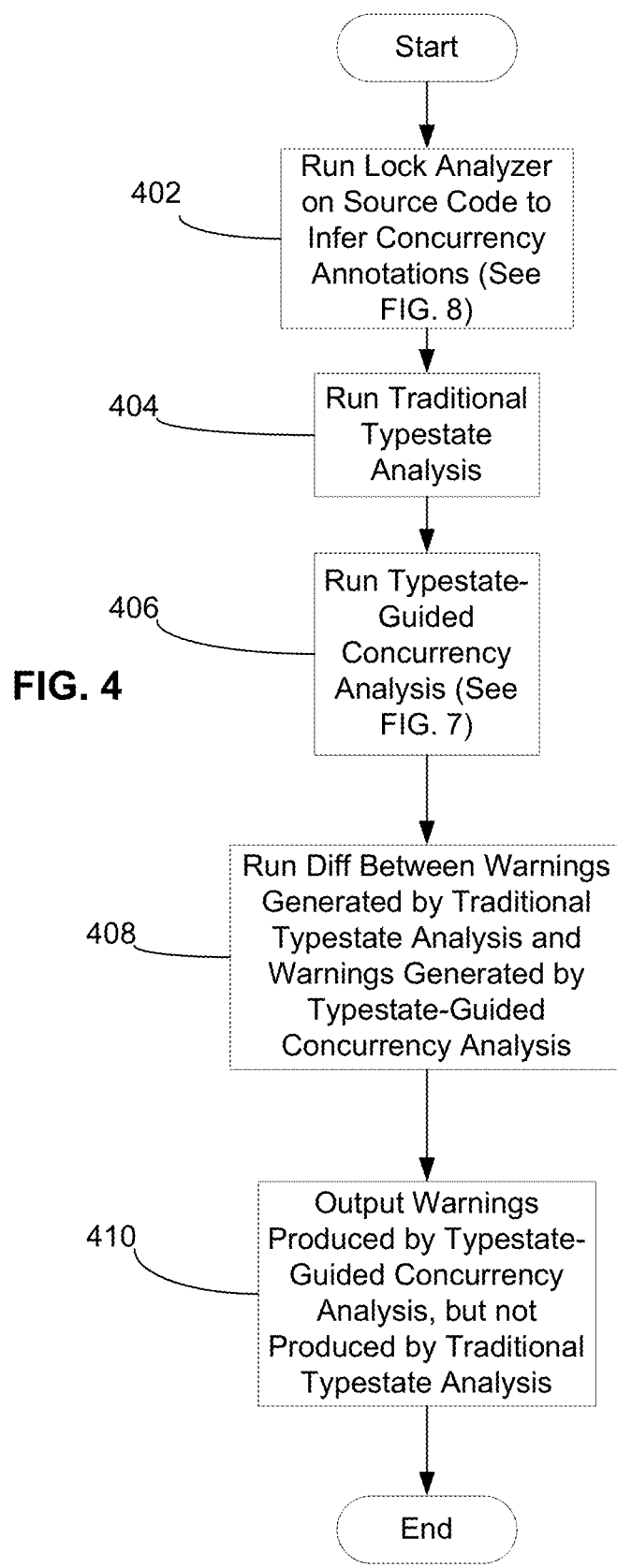
FIG. 4 is a flowchart of a high-level process of performing analysis on computer instructions, such that only warnings uniquely detected by concurrency-guided typestate analysis are output.

FIG. 4 is a flowchart of a high-level process of performing analysis on computer instructions, such as computer instructions 202, such that only warnings uniquely detected by concurrency-guided typestate analysis are output. The process may begin, for example, with the invocation of the computer instructions analysis tool 200, illustrated in FIG. 2, or may be implemented in general by computer-executable instructions.

Figure 8:
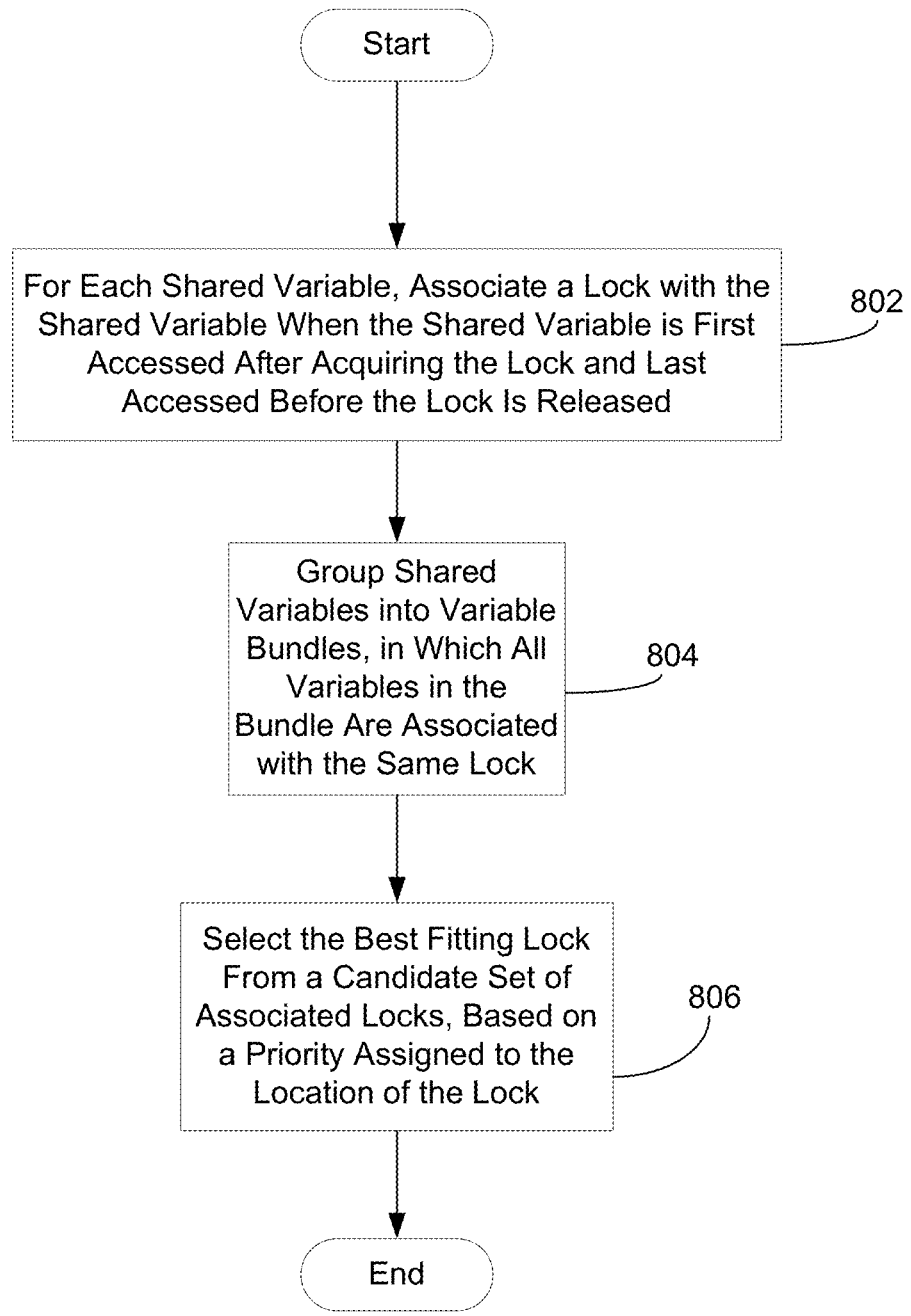
FIG. 8 is a flowchart of a process of analyzing computer instructions to infer variable-lock associations.

At block 402, the process may optionally infer concurrency annotations by processing the computer instructions. This step may be done if annotations are not suitably included in the computer instructions, and may be performed by a lock analyzer, such as conventional concurrency analysis component 212 illustrated in FIG. 2. Inferring concurrency annotations may involve inferring which lock may be intended to protect a particular shared variable or set of shared variables from concurrent access. A more detailed flowchart of the process of block 402 is illustrated in FIG. 8, discussed at greater length below.

At block 404, the process may run a conventional (i.e., non-concurrent) typestate analysis. That is, block 404 involves performing typestate analysis that is best suited for sequential programs, and that may not consider typestate issues that may arise due to concurrency. This step may be implemented, for example, by conventional typestate analysis component 214, and may involve performing any type of typestate analysis, including any or all of the types illustrated in FIG. 3. Performing the conventional typestate analysis may result in a first set of warnings being indicated by the tool. The warnings may be indicated by the tool in any suitable way. For example, the warnings may be output on a display screen to a user or they may be recorded in volatile or non-volatile computer memory for later processing, and may be in any suitable format, including text or binary.

Figure 7:
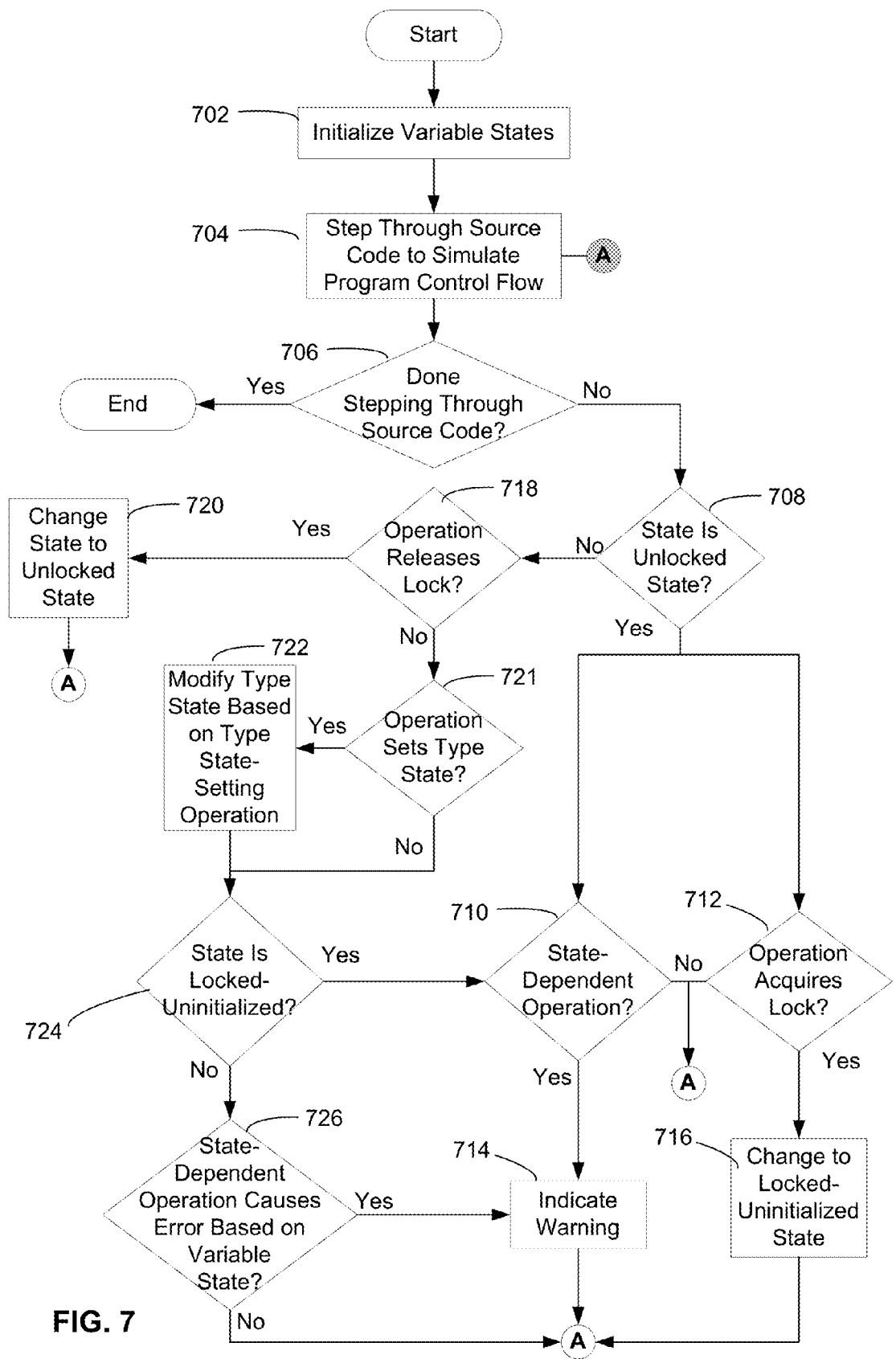
FIG. 7 is a flowchart of a detailed process of performing concurrency-guided typestate analysis.

The process may then proceed to block 406, in which it may run concurrency-guided typestate analysis, which may take into consideration typestate issues that may arise due to concurrent access to a shared variable. This step may be implemented, for example, by concurrency-guided typestate analysis component 216, and may involve performing any type of typestate analysis, including any or all of the types illustrated in FIG. 3. In some embodiments, the type(s) of typestate analysis performed at block 406 may be the same type(s) of typestate analysis as that performed at block 404. For example, in both blocks 404 and 406, NULL pointer analysis 302 and double close analysis 306 may be performed. Performing the concurrency-guided typestate analysis may result in a second set of warnings being output. The warnings may be output in any suitable way, including in the modes of output discussed above in connection with block 404. A more detailed flowchart of the process of block 406 is illustrated in FIG. 7, discussed at greater length below.

Proceeding to block 408, the process may then compare the first set of warnings (i.e., the warnings output by the conventional, non-concurrent, typestate analysis) with the second set of warnings (i.e., the warnings output by the concurrency-guided typestate analysis). This may be done in any suitable way, and may be implemented, for example, by warning filter module 218 of FIG. 2. The step at block 408 may involve computing the differences between the first set of warnings and the second set of warnings. The comparison performed by block 408 may be based on lines or portions of computer instructions indicated as having an issue by both the non-concurrent typestate analysis and the concurrency-guided typestate analysis.

At block 410, the process may then output all warnings in the first set of warnings that are not in the second set of warnings. This may be implemented, for example, by warning filter module 218 of FIG. 2. The output may be made in any suitable way, including according to the modes of operations discussed in connection with block 404. In some embodiments, the output produced by block 410 may be displayed to a user, while the output of blocks 404 and 406 may be recorded at least temporarily in computer memory. Thus, the step at block 410 outputs warnings that are uniquely output by concurrency-guided typestate analysis that would not have been generated by other types of analysis, such as conventional typestate analysis. In some embodiments, conventional typestate analysis may produce a significant number of potentially harmless warnings, while concurrency-guided typestate analysis may produce warnings that more accurately pinpoint potential problems in the computer instructions. Thus, filtering out conventional typestate analysis warnings from the output of the concurrency-guided typestate analysis may result in even greater levels of accuracy in the ratio of reported warnings to actual potential problems in the computer instructions. The warnings output by the step at block 410 may be output or otherwise indicated to the user in any suitable way, including by being stored in volatile or non-volatile memory, such as a file, or displayed onto a visual display. The process of FIG. 4 may then be done.

FIG. 5A is an example of computer instructions, implemented in a programming language such as C, such as may be analyzed by the computer instructions analysis tool 200 according to the process illustrated by the flowchart of FIG. 4. The computer instructions of the example of FIG. 5A displays a NULL pointer dereference problem that may be detected by concurrency-guided typestate analysis, but that would fail to be detected by either conventional typestate analysis or by conventional concurrency analysis. While FIG. 5A illustrates a NULL pointer dereference problem on which is performed NULL pointer analysis, it is to be appreciated that similar situations may arise that may be detected by other types of typestate analysis, such as any of the other types illustrated in FIG. 3. FIG. 5A illustrates a data structure ("DATA," defined in lines 1-4) and two functions ("ProcessBuffer" defined in lines 1-12, and "FreeBuffer" defined in lines 1-8) that perform operations on the data structure. The data structure includes a pointer to a buffer ("buffer," line 3) and a lock ("cs," line 2) associated with the pointer to the buffer. As is known in the art, a lock may be associated with a shared variable, in which a shared variable is a variable that may be accessed by multiple threads executing concurrently. A lock may be used with the intent to guard the variable from concurrent access by the multiple threads. A particular portion or region of computer instructions that is guarded by a lock may be termed a "locking block," "locking region," or a "critical section." Thus, to ensure exclusive access by a thread to the shared variable, whenever the shared variable is accessed in the computer instructions, the computer instructions must first include an operation to enter a critical section (also sometimes referred to as, "acquiring a lock"), in which the operation to enter the critical section references the lock associated with the shared variable. When exclusive access to the shared variable is no longer required by a particular thread, the computer instructions may then include an operation to leave the critical section (also sometimes referred to as, "releasing a lock"), in which the operation to leave the critical section references the lock associated with the variable. As discussed above, a situation in which a shared variable is accessed outside of a critical section, and thus not protected by a lock, may lead to a condition known as a race condition.

As can be seen in the example of FIG. 5A, all accesses to the buffer are within a critical section, and are thus protected by the lock. For example, the access at line 7 is preceded by an operation at line 6 to enter the critical section, and succeeded by an operation at line 8 to leave the critical section. Similarly, the subsequent access to the buffer at line 14 is surrounded by operations to enter and leave the critical section. Thus, because all accesses to the shared variable are protected by the lock, a lock analyzer such as conventional concurrency analysis component 212 of FIG. 2 may not detect any race conditions, and may therefore not indicate any warnings to a user.

As discussed above, this example illustrates a NULL pointer dereference problem. However, a NULL pointer dereference problem may not have been detected by conventional typestate analysis, such as typestate analysis component 214 performing NULL pointer analysis 302. NULL pointer analysis, when performed using a conventional typestate analysis, may detect that a pointer variable is not dereferenced when a value of the pointer variable determined by simulating a sequence of operations is NULL. Considering the computer instructions in the example of FIG. 5A in sequence, as may be done in conventional typestate analysis, may detect no problem. As can be seen, before the pointer variable to the buffer is dereferenced in line 14, the program implemented by the computer instructions has first determined at line 7 that the pointer variable to the buffer is not NULL. If the pointer variable had been NULL, the program would have returned out of the ProcessBuffer function, and would not have reached line 14.

However, a NULL pointer dereference problem does indeed exist in the example of FIG. 5A, and can be detected when the possibility of concurrency is taken into account. In the example of FIG. 5A, the functions ProcessBuffer and FreeBuffer may be executing concurrently by different threads. Thus, after a first thread leaves the critical section in line 11, a second thread may enter a critical section at line 18, in which it may free up memory for the buffer (at line 20) and set the value of the pointer variable to the buffer to NULL (at line 21). While the second thread is in the critical section of lines 18-23, the first thread may not enter the critical section of lines 13-15. Thus, if the first thread is trying to enter the critical section of lines 13-15, it must first wait until the second thread leaves the critical section of lines 18-23. When the second thread does leave the critical section at line 23, the first thread may then enter the critical section at line 13. However, at this point, the value of the pointer variable to the buffer has changed to NULL as a result of the operations performed by the second thread. Thus, when the first thread attempts to dereference the pointer variable at line 14, it may in fact be dereferencing a NULL pointer. Thus, FIG. 5A illustrates an example of a situation in which the state of the buffer variable changed from not-NULL to NULL between the point when the first thread left the first critical section at line 11 and the point when the first thread entered the second critical section at line 13, thus leading to an error condition in the execution of the state-dependent operation, which in this case is a pointer dereference operation at line 14. By taking into account issues that may arise due to concurrent access to a shared variable, concurrency-guided typestate analysis may detect these classes of problems that may not have been easily detected by other approaches, including conventional concurrency analysis or conventional typestate analysis.

In addition to being able to detect problems that could not be previously detected, concurrency-guided typestate analysis may also be able to determine that what may have been detected as a potential problem using another form of analysis is, in fact benign. Thus, concurrency-guided typestate analysis may produce fewer potentially misleading warnings, thereby allowing a user to focus on warnings that are more likely to be truly problematic. FIG. 5B is an example of computer instructions that may be correctly determined to be benign by concurrency-guided typestate analysis, but that may be incorrectly determined to be problematic by other types of analysis, such as conventional concurrency analysis.

FIG. 5B illustrates a common programming optimization technique that attempts to minimize the number of times a lock is acquired and released. This technique may be employed because in many programming environments, acquiring a lock frequently may be associated with reduced performance. The function AccessBuffer in FIG. 5B attempts to print out the contents of the buffer only if a pointer variable to the buffer does not have a NULL value. Thus, before dereferencing the pointer variable pointing to the buffer in order to print out the contents of the buffer at line 7, AccessBuffer ensures in a check at line 6 that the value of the pointer variable to buffer is not NULL. Because the buffer may be a shared variable, the operations at lines 6-7 are protected by a lock in a critical section to ensure that a NULL pointer dereference does not occur. However, another access to the buffer at line 2 is not in any critical section, which may cause a tool performing conventional concurrency analysis to report a warning of a possible race condition. In fact, the unprotected access at line 2 is benign and most likely intentional. This may be the case, for example, in situations in which printing out the contents of the buffer may not be a critical task that absolutely must be performed whenever the buffer is not NULL. The concurrency-guided typestate analysis may be able to determine that the pointer dereference is suitably protected in a critical section at line 7 based on the state of the shared variable, and may thus not output a warning.

However, on the other hand, if the check at line 6 in FIG. 5B had been omitted, this may constitute an actual problem, as the value of the pointer variable may have been set to NULL by another thread in between the check at line 2 and entering the critical section at line 5. This actual problem (i.e., if the check at line 6 had been omitted) would have been detected by concurrency-guided typestate analysis, but may not have been detected by conventional typestate analysis, as conventional typestate analysis would have been misled by the prior check at line 2, and would not have taken into account that the shared variable may have had a different state due to concurrent access to the shared variable by multiple threads. Thus, the analysis performed by concurrency-guided typestate analysis more accurately pinpoints actual errors than other analysis methods, both by the detection of errors not capable of being detected by other analysis methods, and also by avoiding the occurrence of mistakenly identifying benign conditions as potential problems.

Figure 6:
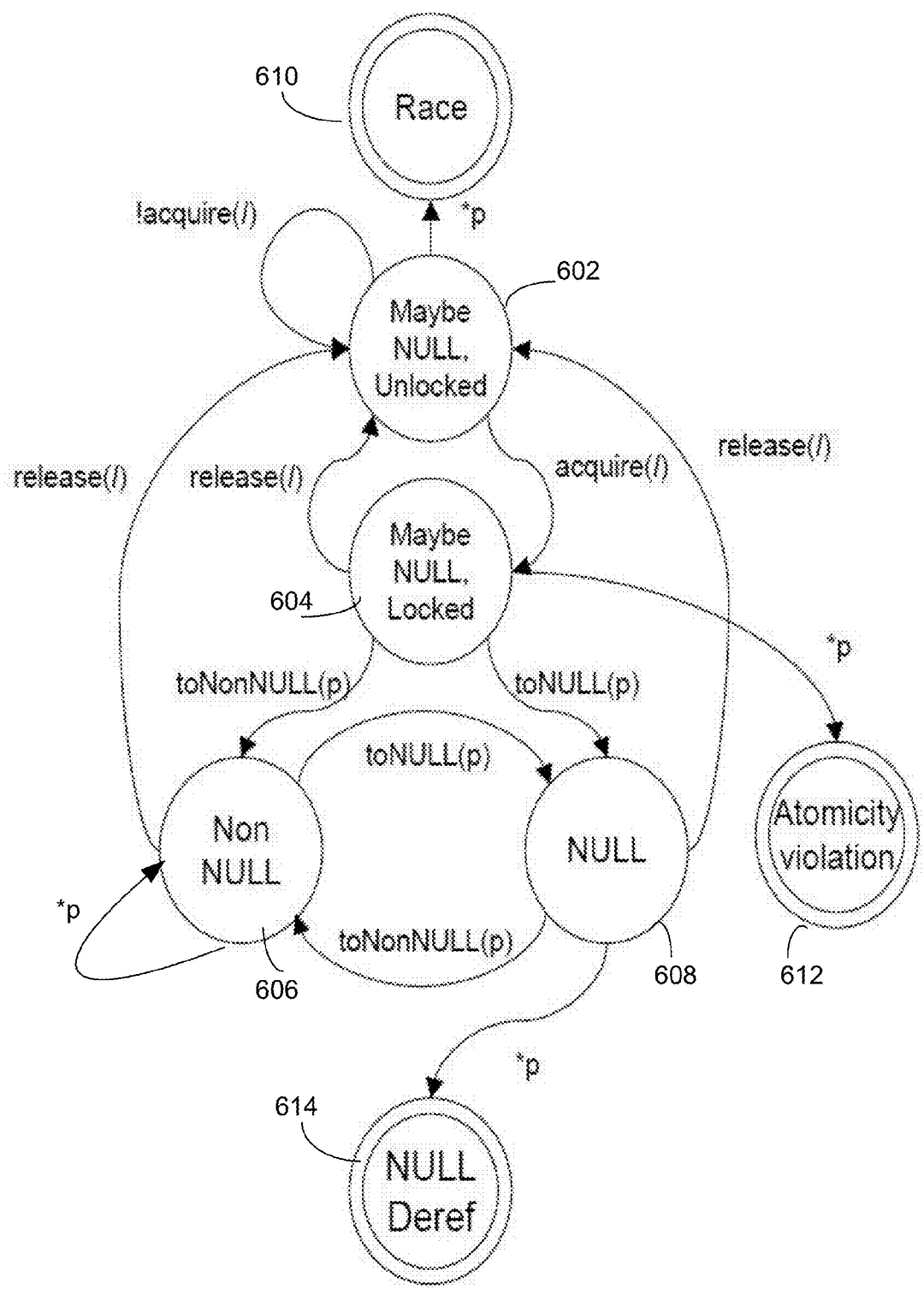
FIG. 6 is a state transitions diagram illustrating the states of a variable being tracked by concurrency-guided typestate analysis.

FIG. 6 is a state transitions diagram that may be used to track the states of a variable during concurrency-guided typestate analysis. In this case, a variable is a pointer that may have states relevant to high level race detection of "NULL," "Not-NULL," or "unknown." Other types of variables may have other types of states. For example, variables representing a file handle may have states "open" or "closed." The state transitions may be implemented in any suitable way, including, for example, by components of the computer instructions analysis tool 200, such as concurrency-guided typestate analysis component 216. It should be appreciated that while the example of FIG. 6 refers to NULL pointer analysis, a similar state transition diagram could be implemented that would apply to other forms of typestate analysis.

In order to simulate the effects of concurrent threads accessing a shared variable, the concurrency-guided typestate analysis may, in some embodiments, simulate the "worst case scenario" due to thread interleaving by discarding the state information associated with a variable when the variable is not protected (e.g., locked) by its intended lock. The simulation may entail stepping through computer instructions representing a control flow of the input program, and determining how each operation in the computer instructions may change or set the state associated with the variable. Thus, if the concurrency-guided typestate analysis were performed on the example of FIG. 5A, assuming that the analysis has inferred that "p→buffer" is intended to be guarded by "p→cs," simulating the worst case scenario may by the analysis would entail resetting the state of "p→buffer" to an "unlocked" state when the guarding lock is released at line 7. When a variable is in the "unlocked" state, the concurrency-guided typestate analysis may assume the worst-case scenario whenever the variable is referenced in any state-dependent operations, in which the state dependent operation may lead to an error condition depending on the state of the variable. Thus, in the NULL pointer dereference problem, when a variable is in the "unlocked" state, any pointer dereference operation referencing the variable is considered a potential error, and may result in a warning being indicated to the user.

In the state transition diagram of FIG. 6, state 602 is illustrated as being the "unlocked" state. As can be seen, while the variable is in state 602, any pointer dereference (illustrated as transition "*p") leads to state 610, in which the analysis may conclude that a possible error condition may arise resulting from a race condition. In the embodiment illustrated in FIG. 6, the variable will stay in the unlocked state until the lock associated with the variable is acquired. Thus, any explicit modifications to the value of the variable (e.g., setting the value of the variable to NULL or not-NULL) while the variable is in state 602 may be ignored by the analysis, as any NULL pointer dereference may be interpreted as a potential error while the variable is in the state 602.

When the lock associated with the variable is acquired while the variable is in state 602 (e.g., the "unlocked" state), the variable may then transition to the "locked-uninitialized" state, illustrated in FIG. 6 as state 604. When the variable is in state 604, this may indicate that the variable is protected, but that the current value of the variable is unknown or uninitialized. The analysis may again assume the worst case scenario, so that any pointer dereference operation referencing the variable while the variable is in state 604 may also be interpreted in all cases as a potential error, thus transitioning the variable to state 612, in which a potential error may be indicated to the user, illustrated in FIG. 6 as resulting from an atomicity violation.

However, unlike in state 602, when the variable is in state 604, modifications to the value of the variable may be taken into account by the analysis. Thus, the analysis may modify the value of the variable to NULL or non-NULL, as appropriate, based on a simulated operation that sets the value of the variable. This is illustrated in FIG. 6 as transitions to states 606 and 608 when the value of the variable is set, such as by a simulated operation, to Non-NULL and NULL, respectively. While in either of state 606 or 608, the value of the variable may continue to be tracked, as any other simulated operations may further change its value from Non-NULL to NULL, or vice-versa. Thus, while in state 606, if a simulated operation sets the value of the variable to NULL, the variable may then transition to state 608; conversely, while in state 608, if a simulated operation sets the value of the variable to Non-NULL, the variable may then transition to state 606. While in states 606 and 608, any state-dependent operation, such as pointer dereference operation may be processed by the analysis based on the actual simulated value of the variable. Thus, if a variable is in state 608, thus having a NULL value, any pointer dereference operation referencing the variable may result in the variable transition to state 614, thus indicating that an error condition may result, illustrated in FIG. 6 as NULL pointer dereference error. Conversely, encountering a pointer dereference operation referencing the variable while the variable is in state 606 may not result in any state transitions, as the variable may simply remain in state 606.

It is to be noted that while the variable is in any of the locked states (i.e., states 604, 606 and 608), encountering any simulated operation that releases the lock associated with the variable, thus un-protecting the variable, may result in the variable transitioning to the unlocked state, illustrated in FIG. 6 as state 602. This may be done to simulate the worst-case scenario, because while a shared variable is unlocked, its value may be changed at any time by another thread. Thus, any assumptions about the value of the variable (e.g., whether the variable is NULL or non-NULL) while the variable is unlocked may be misguided or incorrect, as the value of the variable may be "silently" changed at any time by another thread.

FIG. 7 is a flowchart of a detailed process of performing concurrency-guided typestate analysis. The process of FIG. 7 may begin with the invocation of the source instruction analysis tool 200 of FIG. 2 when the source instruction analysis tool is configured to perform concurrency-guided typestate analysis. The process may be implemented, for example, by concurrency-guided typestate analysis component 216. A higher-level treatment of the overall process, including that illustrated by FIG. 7 is given by FIG. 4, as discussed above. Before the invocation of the process of FIG. 7, in some embodiments, as illustrated in FIG. 4, shared variables and locks may be associated into variable-lock associations, in which each lock in a variable-lock association is intended in the computer instructions to guard all variables in the variable-lock association from concurrent access. The variable-lock associations may be based on concurrency annotations, either explicitly indicated in the computer instructions or inferred from the usage patterns of the shared variables and locks in the computer instructions.

Once the variable-lock associations have been established, at block 702, the process may initialize the state associated with each variable. While the state of a variable may be represented in any suitable way, in some embodiments, the state of a variable may be a tuple of two types of states, a locking state and a type state associated with the variable. The locking state associated with a variable may be the "locked" state when the simulated state of the variable, at a point while stepping through the program, is such that the variable is currently guarded by the associated lock. The locking state associated with a variable may be the "unlocked" state when the simulated state of the variable indicates that the variable is currently unguarded by the associated lock. On the other hand, the type state may be set to the uninitialized state when the locking state associated with the variable is the unlocked state or when the locking state associated with the variable is first set to the locked state after having been set to the unlocked state.

During the process of stepping through the program, a state may be determined for each instruction or group of instructions that constitutes a step. The type state may be based on based on operations performed on the variable in the computer instructions that modify the type state of the variable at each step. A type state-setting operation may modify the value of the variable itself. For example, in the NULL pointer dereference problem, the type state associated with a variable currently associated with a locking state set to "locked" may be NULL or Non-NULL, depending on the value assigned to it by operations in the computer instructions that modify the value of the variable. In addition to or instead of modifying the value of the variable itself, a type state-setting operation may additionally or alternatively be an operation that modifies the state of the program under analysis, in which the modified program state is identified by the value of the variable. For example, in the double close problem, the value of a file handle variable may be the identifier for a file structure containing state information associated with a file. The type state associated with the variable may be closed or open, depending on the state information contained in the file structure. Thus, a type state-setting operation in the context of the double close problem could modify the state information contained in the file structure identified by the file handle variable, rather than, or in addition to modifying the value of the file handle variable itself.

Thus, at block 702, the process initializes the locking state of each variable to "unlocked" and the type state of each variable to "uninitialized."

Proceeding to block 704, the process may step through the computer instructions to simulate at least one control flow of the program implemented by the computer instructions. This may be done in any suitable way, including by making use of a control flow graph representing at least one control flow of the program, such as control flow graph 206 illustrated in FIG. 2. As the process steps through the computer instructions in at least one control flow of the program, it may process operations referenced in the computer instructions in order to perform the analysis.

The process discussed below may be performed for each shared variable in a variable-lock association. The process may then proceed to block 706, in which it may check whether the process is done stepping through the computer instructions. If it has determined that it is not done stepping through the computer instructions, the process may proceed to block 706, in which the process may determine whether the current state of the shared variable is the unlocked state, which may signify that the simulated state of the variable is not currently protected by its associated lock.

If it is determined that the simulated locking state of the variable is the unlocked state, then the process branches to both blocks 710 and 712. The branch may be performed either sequentially or serially, as some embodiments may operate in either fashion. At the branch for block 710, the process may then determine whether the current operation is a type state-dependent operation. Thus, the computer instructions may comprise type state-dependent operations. A type state-dependent operation may depend on the type state of the shared variable such that for a first set of type states associated with the variable, instructing a computer to execute the type state-dependent operation may lead to a particular error condition, while for a second set of type states of the variable, instructing a computer to execute the type state-dependent operation may not lead to the particular error condition. For example, in the example of the NULL pointer dereference problem, a type state-dependent operation may correspond to dereferencing a pointer variable. The first set of type states may correspond to the NULL state, while the second set of type states may correspond to the Non-NULL state.

If it is determined at block 710 that the current simulated operation is a type state-dependent operation, then the process may proceed to block 714, in which it may indicate a warning. The warning may be any suitable type of warning. In some embodiments, the warning may describe the potential error as a race condition error. The warning may be indicated in any suitable way, or in any suitable format, as discussed in connection with FIG. 4. The process may then proceed back to block 704, in which it may continue to step through the computer instructions.

On the other hand, if it is determined at block 710 that the current simulated operation is not a type state-dependent operation, the process may proceed back to block 704.

At the branch of block 712, the process may determine if the current simulated operation is an operation in which the lock associated with the variable is acquired. If so, the process may proceed to block 716, in which it may change the state of the variable to the "locked-uninitialized" state. The "locked-uninitialized" state may indicate the variable has been locked, but that the current value of the variable is unknown or uninitialized. Thus, "locked-uninitialized" may be a short-hand for specifying that the locking state of the variable is locked and the type state of the variable is "uninitialized." The process may then proceed back to block 704.

On the other hand, if it is determined at block 712 that the current simulated operation is not an operation in which the lock associated with the variable is acquired, the process may proceed back to block 704.

On the other hand, if it is determined at block 708 that the locking state of the variable is not the "unlocked" state, then the state of the variable must be "locked," and the process may then proceed to block 718. At block 718, the process may check if the current simulated operation releases the lock associated with the variable. If so, the process may proceed to block 720, in which it may transition the locking state of the variable to the unlocked state. In some embodiments, at this step, the type state associated with the variable may also be set to the "uninitialized" state. The process may then proceed back to block 704.

Returning back to block 706, if it is determined that the process is done stepping through the computer instructions, the process may then be done at this point. At the end of the process, any warnings generated by the process may be output. As discussed in connection with FIG. 4, the resulting warnings may then be processed, such as by a filter. The filtered results may then be indicated to a developer, allowing him to take action to fix any necessary issues pinpointed by the analysis.

On the other hand, if it is determined at block 718 that the current simulated operation does not release the lock associated with the variable, then the process may proceed to block 721 in which the process may determine if the current operation is a type state-setting operation, as discussed above. This may involve tracking how the type state of the variable may change when the current operation in the computer instructions is a type state-setting operation that may set the type state of the variable. For example, in the example of the NULL pointer dereference discussed above, the value of the variable may change based on a type state-setting operation that sets the value of the variable to a NULL or a Non-NULL value. When a simulated operation is encountered that changes the value of the variable, the type state of the variable may change. For example, if the variable had been in the "locked-uninitialized" state, it may be in another known, locked state (e.g., "locked-NULL" or "locked-Non-NULL," in the case of NULL pointer dereference analysis) upon encountering a simulated operation that changes the value of the variable. If the current operation is a type state-setting operation, then the process may proceed to block 722, in which it may change the type state of the variable based on the changes to the type state of the variable that would be made by the type state-setting operation. The process may then proceed to block 724. On the other hand, if the current operation is not a type state-setting operation, the process proceeds directly to block 724.

At block 724 in which it determines whether the current state of the variable is the "locked-uninitialized" state. Because the locking state of the variable at this point may be known to be the locked state, this step may involve checking to see if the type state associated with the variable is the "uninitialized" state. If so, then the process may proceed to block 710, in which, as discussed above, it may check whether the current operation is a type state-dependent operation. If it is determined at block 710, that the current operation is a type state-dependent operation, the process may proceed to block 714, in which it may indicate a warning. Any suitable warning may be indicated. In some embodiments, the warning may describe the possible error as an atomicity violation. The process then proceeds back to block 704. Otherwise, if it is determined at block 710 that the current operation is not a type state-dependent operation, the process may then proceed back to block 704.

On the other hand, if it is determined at block 724 that the current simulated state of the variable is not "locked-uninitialized," then the process proceeds to block 726. At block 726, the process may determine whether the current simulated operation is a type state dependent operation that, if referencing the variable in its current simulated state, would lead a program implemented by the computer instructions to a particular error condition based on the current simulated state of the variable. In general, as discussed above, when the type state associated the variable is in the first set of type states, then a type state-dependent operation that references the variable may lead to an error condition, while when the type state associated with the variable is in the second set of type states, then a type state-dependent operation that references the variable may not lead to an error condition. For example, in the NULL pointer dereference analysis, this step would involve checking if the current simulated operation is an operation that dereferences the variable, and if so, if the variable has a value of NULL. If it is determined at block 726 that the current simulated operation is a type state dependent operation that, if referencing the variable in its current simulated type state, would lead a program implemented by the computer instructions to a particular error condition based on the current simulated type state of the variable, then the process may proceed to block 714, in which it may indicate a warning. The process may indicate any suitable warning. In some embodiments, the warning may describe the error as the particular type of typestate violation, for example, a NULL pointer dereference error. The process may then proceed back to block 704. Otherwise, if it is determined at block 726 that the current simulated operation is not a state dependent operation that, if referencing the variable in its current simulated state, would lead a program implemented by the computer instructions to a particular error condition based on the current simulated state of the variable, then the process may proceed back to block 704.

FIG. 8 is a flowchart of a process of analyzing computer instructions to infer variable-lock associations. Inferring variable-lock associations, or which lock is intended to guard a particular variable, may be important when performing concurrency-guided typestate analysis. As discussed above, during the course of the analysis, the typestate of a variable may change based on whether the variable is protected by the lock that is intended to guard the variable, thereby possibly changing the result of the analysis. Thus, the result of the analysis may be different if the variable is not correctly associated with the lock that is intended to guard it. The process of FIG. 8 may be invoked by the computer instructions analysis tool 200, and may be implemented by one or more components of the source instruction analysis tool, such as the conventional concurrency analysis 212.

As discussed above, some computer instructions may explicitly indicate through annotations, for example, an association between a shared variable and a lock, thus indicating that the lock is intended to guard the shared variable. FIG. 9A illustrates an exemplary concurrency annotation in line 3, indicating that the "buffer" variable is "guarded_by" the "cs" lock. Moreover, the concurrency-guided typestate analysis performed according to some embodiments can additionally or alternatively infer such variable-lock associations based on usage patterns in the computer instructions of the shared variables and the locks. Some embodiments may employ a heuristic-based approach that may be motivated by the inventors' observation that programmers are often correct; thus, in some embodiments the inference analysis may infer the assumptions made by programmers of the computer instructions based on evidence exhibited by particular code paths.

At block 802, the process involves, for each shared variable, associating a lock with the shared variable. The step of block 802 may comprise analyzing each locking block or critical section, and to associate the lock with the variable if the variable is first accessed after acquiring the lock and is last accessed before the lock is released. The inventors have recognized that developers generally attempt to minimize the locking scope in order to improve performance and avoid deadlocks. For example, in the computer instructions example of FIG. 5A, the shared variable "p→buffer" is accessed immediately after "p→cs" is acquired. If "p→buffer" does not need to be guarded by "p→cs," the access to "p→buffer" could have been moved before the lock acquire operation.

Furthermore, the inventors have recognized that a plurality of variables may frequently be associated with the same lock such that the plurality of variables should be treated as an atomic unit. For example, a point object may be comprised of separate "x" and "y" variables. Thus, when updating just one of variable "x" or "y," a lock may need to be acquired to protect the other variable to ensure that the two variables are updated atomically and have a consistent state. Such a plurality of variables may be termed a bundle.

Thus, at block 804, the process may infer that multiple shared variables should be grouped into variable bundles, in which all the variables in the bundle are in the same variable-lock association, and are thus all associated with the same lock. The inference may be done in any suitable way. In some embodiments, if the same lock seems to be used to guard a group of variables, then the process may infer that all variables in the group need to be processed atomically, and thus belong in the same variable bundle.

The process may then proceed to block 806, in which it may, for each shared variable, select the best fitting lock from a candidate set of associated locks, in which the selection is based on a priority assigned to the location of the lock definition in the computer instructions. FIG. 9B illustrates exemplary locations for a lock corresponding to four different priorities. In the example illustrated by FIG. 9B a lower priority number for the lock location is preferred when selecting a best fitting lock.

In the example of FIG. 9B, the highest priority (priority 1) pertains to a lock that is a field of a parent of the shared variable. Thus, if shared variable "buffer" is being protected, its parent is the "DATA_1" data structure, of which the lock "cs" is also a field. The second highest priority (priority 2) in the example of FIG. 9B may pertain to a lock reachable from the parent of the variable, but that is not at the same level as the variable. Thus, in priority 2, shared variable "buffer" is now a field of the "DATA_2" data structure. Unlike "DATA_1," "DATA_2" does not contain a lock at the same level as "buffer." Rather, "DATA_2" contains a pointer to another data structure, "d1," which itself contains locks, including lock "cs1." Thus, "cs1" is reachable from the parent of "buffer," but is not at the same level as "buffer." The third highest priority (priority 3) in the example of FIG. 9B corresponds to a lock reachable from a formal parameter location. In line 15, the function definition for ProcessBuffer includes a formal parameter "pcs." The fourth highest priority (priority 4) in the example of FIG. 9B may correspond to a lock reachable from a global location, and therefore, may be reachable from any point in the program. In the example of FIG. 9B, "global_cs" is a global lock.

Returning to FIG. 8, the inference analysis may choose the guarding lock from a non-empty priority level that has the highest priority. In some embodiments, locks reachable from the shared variable itself may be ignored, as the inventors have recognized that such locks are probably intended to protect fields of the shared variable (in situations in which the shared variable is a pointer to a structure, for example), but not the shared variable itself. Once the best-fitting guarding lock has been selected to be associated with a shared variable, the method of FIG. 8 may be done at this point.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of analyzing computer instructions, the computer instructions specifying actions by a computer and the computer instructions implementing a program, the method comprising:
   stepping through the computer instructions to simulate at least one control flow of the program; and
   while stepping through the computer instructions, for each variable in at least one variable-lock association, each variable-lock association being comprised of a variable and a lock associated with the variable that is intended to guard the variable from concurrent access:
      when the lock associated with the variable is referenced in an operation in the computer instructions that instructs the computer to leave a critical section, then changing a locking state associated with the variable to an unlocked state;
      when the locking state associated with the variable is the unlocked state and when the variable is referenced in a type state-dependent operation in the computer instructions, then indicating a warning, the variable being further associated with a type state, wherein executing a type state-dependent operation referencing the variable instructs the computer to enter into a particular error condition when the variable is associated with the type state in a first set of type states and executing a type state-dependent operation referencing the variable does not instruct the computer to enter into the particular error condition when the variable is associated with the type state in a second set of type states;
      when the lock associated with the variable is referenced in an operation in the computer instructions that instructs the computer to enter the critical section, then changing the locking state associated with the variable to a locked state, and changing the type state associated with the variable to an uninitialized state; and
      when the locking state associated with the variable is the locked state, when the type state associated with the variable is the uninitialized state, and when the variable is referenced in another type state-dependent operation in the computer instructions, then indicating the warning.

2. The method of claim 1, wherein the method further comprises, while stepping through the computer instructions when the locking state associated with the variable is the locked state:
   when the variable is referenced in a type state-setting operation in the computer instructions that instructs the computer to perform instructions that set the type state of the variable to a new type state, then changing the type state associated with the variable to the new type state; and
   when the type state associated with the variable is not the uninitialized state and when the variable is referenced in the other type state-dependent operation in the computer instructions, then indicating another warning when the type state associated with the variable is in the first set of type states and not indicating the other warning when the type state associated with the variable is in the second set of type states.

3. The method of claim 2, wherein:
   the variable has a value during the execution of the program on the computer; and
   the other type state-setting operation in the computer instructions comprises an operation that sets the value of the variable.

4. The method of claim 2, wherein:
   the variable has a value during the execution of the program on the computer; and
   the other type state-setting operation in the computer instructions comprises an operation that modifies a program state, wherein the modified program state is identified by the value of the variable.

5. A computer-readable memory having stored therein computer-executable instructions for performing operations to analyze a representation of a computer program, the operations comprising:
   detecting potential control flow errors in the representation of the computer program relating to a variable of the computer program and to a lock of the computer program that is associated with the variable and that is intended to prevent concurrent access to the variable by the computer program, including:
   detecting a reference to the lock in a first portion of the computer program, wherein the first portion is within, and is part of a transition out of, a second portion of the computer program that accesses the variable;
   tracking a change of the lock to an unlocked status in response to the detection of the reference to the lock;
   detecting a typestate-dependent reference to the variable in a third portion of the computer program for which the lock is in an unlocked status and for which the variable is in a null, uninitialized, or unknown status;
   and providing a warning in response to the detection of the typestate-dependent reference to the variable.

6. The computer-readable memory of claim 5, wherein detecting potential control flow errors further includes: detecting a reference to the variable in an entry portion of the second portion of the computer program; tracking a change of the lock to a locked status and a change of the variable to an uninitialized status in response to the detection of the reference to the variable; detecting another typestate-dependent reference to the variable in another portion of the computer program for which the lock is in the locked status and for which the variable is in the uninitialized status; and providing another warning in response to the detection of the other typestate-dependent reference to the variable.

7. The computer-readable memory of claim 5, wherein the operations further comprise: inferring the association between the variable and the lock based on a selection of a best fitting lock from a candidate set of associated locks.

8. The computer-readable memory of claim 7, wherein the selection of a best fitting lock from the candidate set of associated locks is based on a priority assigned to a location of a lock definition in the computer program for each lock in the candidate set of associated locks.

9. The computer-readable memory of claim 5, wherein the operations further comprise: inferring the association between the variable and the lock based on annotations in the computer program that indicate that the variable is intended to be protected by the lock.

10. The computer-readable memory of claim 5, wherein the potential control flow errors include atomicity errors.

11. The computer-readable memory of claim 5, wherein the atomicity errors reflect incorrect synchronization between threads of the computer program.

12. The computer-readable memory of claim 5, wherein the potential control flow errors include race conditions, uninitialized variables, and invalid accesses to variables.

13. The computer-readable memory of claim 5, wherein the computer program is a multithreaded computer program.

14. The computer-readable memory of claim 5, wherein the representation of the computer program includes a source code representation of the computer program or a binary representation of the computer program.

15. The computer-readable memory of claim 14, wherein the representation of the computer program includes Standard Annotation Language (SAL) annotations.

16. The computer-readable memory of claim 5, wherein a value of the lock indicates a protection status for multiple variables of the computer program.

\* \* \* \* \*